Nov. 28, 1933.    E. M. SPLAINE    1,936,773
OPHTHALMIC MOUNTING
Filed Sept. 1, 1930    2 Sheets-Sheet 1
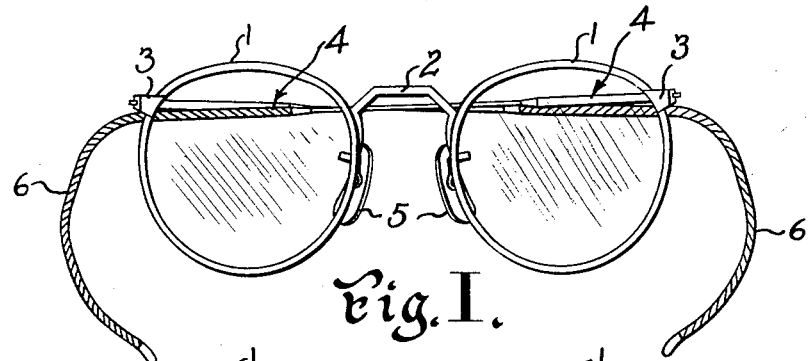
Fig. I.
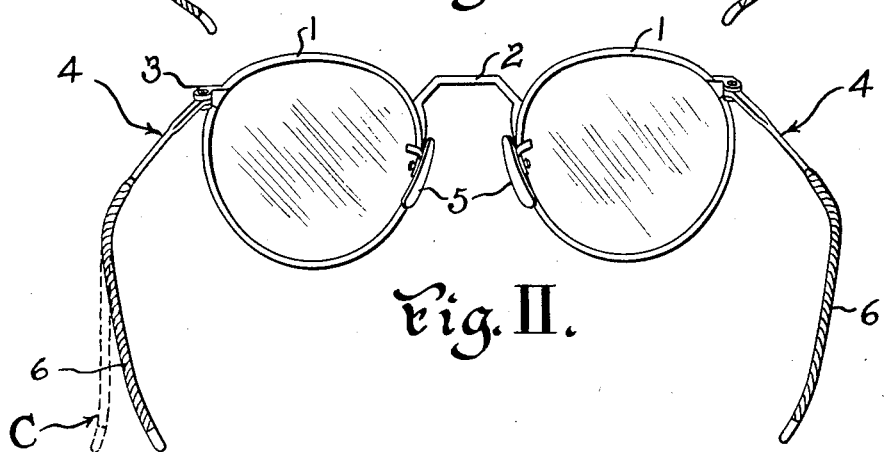
Fig. II.
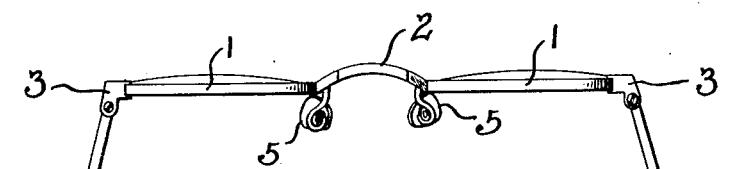
Fig. III.
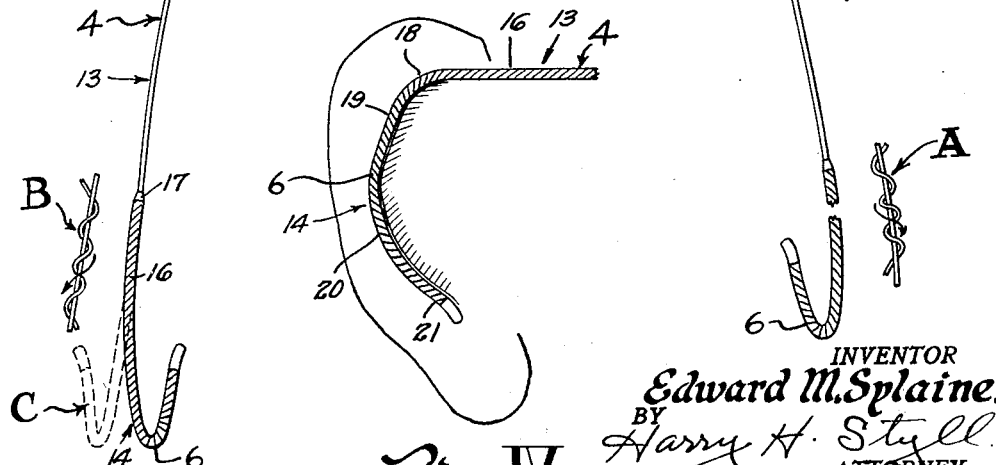
Fig. IV.
INVENTOR
Edward M. Splaine.
BY Harry H. Styll
ATTORNEY

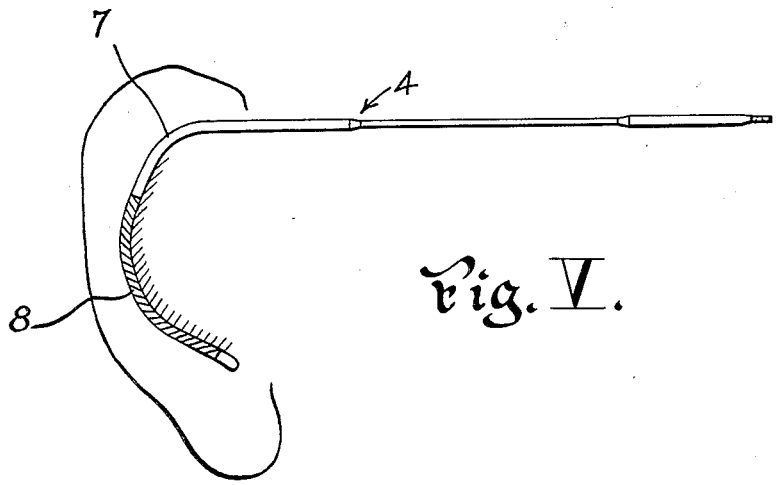
Fig. V.
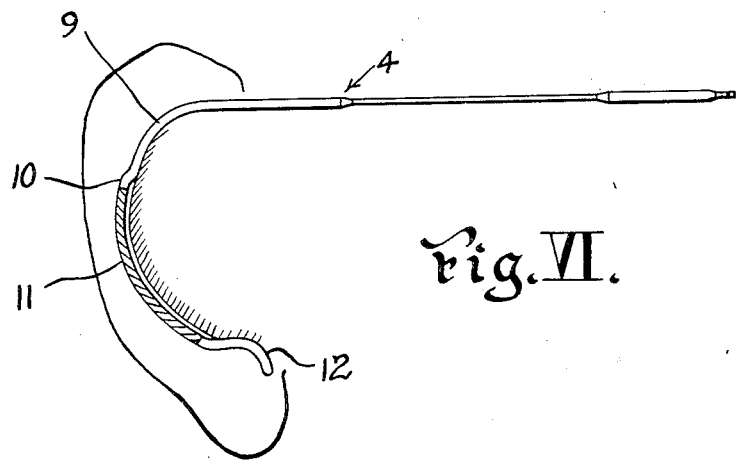
Fig. VI.
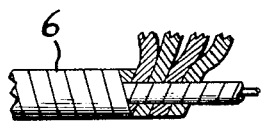
Fig. VII.

Patented Nov. 28, 1933

1,936,773

UNITED STATES PATENT OFFICE 1,936,773

OPHTHALMIC MOUNTING

Edward M. Splaine, Southbridge, Mass., assignor to American Optical Company, Southbridge, Mass., a voluntary association of Massachusetts Application September 1, 1930. Serial No. 479,124

4 Claims. (Cl. 88—52)

This invention relates to improvements in ophthalmic mountings and has particular reference to an improved form of temple or side for said mountings and to the process of making the same.

The principal object of the invention is to provide an improved cable temple or side for an ophthalmic mounting which will be very flexible, soft and comfortable upon the ear of the wearer and which will maintain its shape during its use and has particular reference to the process of making same.

Another object is to provide improved temples or sides for an ophthalmic mounting wherein the tendency of the latent properties of the material to return to its initial set is made use of to maintain a snug and comfortable fit of said temples or sides on the head of the wearer.

Another object is to provide an ophthalmic mounting with cable temples made in pairs, having their cable portions wound in opposite directions so that the tendency of the cable material to return to its initial set or of the windings of the cable to uncoil when earloop portions are formed therein, is made use of to maintain the shape and fit of said temples on the head of the wearer.

A further object is to provide temples having their earloop portions shaped to the contacting contour of the ear.

A further object is to provide a temple having a portion of its ear engaging loop formed of a relatively rigid material and its remaining portion formed of a flexible cable material, the relatively rigid portion being adapted to maintain the adjustment of the length of the temple and the cable portion thereof being adapted to comfortably grip the ear to hold the mounting on the face of the wearer.

A further object of the invention is to provide a temple with a rigid portion which may be adjusted to a definte length to fit the ear and which has a flexible cable portion shaped to but held from engagement with the ear throughout its length and which terminates in a relatively rigid end portion which is adapted to grip the lower portion of the ear through the action of the resiliency of the cable portion, to hold the mounting in place on the face of the wearer.

Other objects and advantages of the invention will become apparent from the following description taken in connection with the accompanying drawings and it will be apparent that many changes may be made in the details of construction, arrangement of parts and steps of the process without departing from the spirit of the invention as expressed in the accompanying claims. I, therefore, do not wish to be limited to the exact details of construction, arrangement and steps of the process shown as the preferred form only has been shown by way of illustration.

Referring to the drawings:

Fig. I is a front elevation of an ophthalmic mounting showing the temples embodying the invention.

Fig. II is a rear elevation of the mounting shown in Fig. I, showing the temples in open position and illustrating in dotted lines the outward twist in the earloop of one of said temples, caused by the action of the latent property of the material which tends to return to its initial set.

Fig. III is a plan view of the mounting shown in Fig. II, having diagrammatic illustrations at the side of each temple, illustrating the direction of the winding of the cable portion of each respective temple.

Fig. IV is a fragmentary side elevation of the earloop portion of the temple shown in position on the ear.

Fig. V is a side elevation of a modified form of temple shown in position on the ear.

Fig. VI is a side elevation of another modified form of temple shown in position on the ear.

Fig. VII is a fragmentary view of the cable portion of the temple shown partly in cross section.

It is well known that in spectacles having cable temples as heretofore provided, that the earloop portion of one of said temples had a tendency to twist sidewise in a direction away from the head of the wearer and would press its end into the ear and cause much discomfort to the wearer. It has been found from past experience that this side twisting of the cable is due to the tendency of the cable material to return to its initial set and also to the fact that the cable portions of all temples were wound in the same direction, causing one to turn inwardly toward the head when acted upon by the latent property of the material, and the other to turn outwardly and irritate the ear.

The present invention obviates this defect by winding the cable portion of each temple in opposite directions, so that the tendency of the material to return to its initial set will cause both temples to turn toward the head and provide a snug and comfortable fit.

Another serious defect in prior art temples which has been obviated in the present invention is the forming of the earloop portion of the cable temple to the contour shape of the ear, thereby forming a temple which will exert an even pressure on the ear throughout its entire contacting area and obviate the tendency of the temple loop as formed in the past, to contact with only protruding portions of the contour of the ear and cut in and hurt the wearer.

Referring to the drawings wherein similar characters of reference denote corresponding parts throughout, the ophthalmic mounting to which the invention is applied comprises a pair of lens rims 1 connected centrally by a bridge member 2 and provided with endpiece members 3 for attaching the temples 4 to the rims. Adjacent the lower end of the bridge member and on the nasal side of the rims 1 there is provided nose guard members 5 for supporting the mounting on the nose of the wearer.

The temples 4 as illustrated in Figures I to IV inclusive are formed with cable portions 6 which are bent to fit the contour shape of the ear and, as illustrated in Fig. III, the cable of each temple is wound in a direction opposite to the other, the right temple being wound in the direction shown diagrammatically at "A" and the left temple in the direction shown diagrammatically at "B". The purpose of winding these cables in opposite directions is to make use of the side twisting tendency of the cables after they have been shaped to fit the ear.

The temple 4 as shown in Figures III and IV comprises a portion 13 which, when viewed from the side, is relatively straight and adapted to extend horizontally along the temporal side of the head, and an ear hook portion 14 which fits about the ear. The side portion 13 is formed with a relatively straight rigid portion 15 adjacent its end opposite the ear and a relatively flexible cable portion 16 at its ear engaging end. The portion 16 is attached to the straight side portion 13 as shown at 17 and blends with and forms a continuation of the straight side portion 13 in the direction of the ear. The portion 16 is shaped to a downwardly curved portion 18 which is adapted to fit over the upper joining point of the helix or margin of the ear to the head and to extend downwardly and rearwardly behind the ear with a relatively straight portion 19 which lies at an angle to the side portion 13 and which is shaped to the angle of and to fit the contour of the upper rear joining portion of the concha or hollow shell-like portion of the ear to the head. The said portion 16 is then turned forwardly and downwardly at 20 at an angle to the straight portion 19 and is shaped to fit the contour of the lower rear joining portion of the concha or hollow shell-like portion of the ear to the head and terminates in an end portion 21 which is curved to fit the rear of the antitragus or that portion of the ear which lies behind the ear passage and behind the lobule of the ear. This hook shaped portion 14 is shaped to the general contour shape of the head joining portions of the ears of different individuals and any variations in said joining portions may be compensated for by slight adjustments when the mounting is being permanently fitted to the wearer. These adjustments in most instances are very slight and the necessity thereof is often overcome by the resiliency of the cable portion which allows the angular relation of the portions 19 and 20 to change to meet the requirements of the wearer. In all instances when the temple is properly fitted to the wearer, the hook shaped portion 14 will bear against the ear substantially throughout its entire ear contacting area.

In the past, as previously stated, all cables were wound in the same direction and, as shown in dotted lines in Figures II and III, one of the earloop portions wound turn inwardly towards the head of the wearer and the other would turn outwardly as at "C" and cause irritation and distress to the wearer. The changing of the direction of the windings of the cables of this outwardly turning temple, as stated above, tends to cause it to twist toward the head and fit comfortably behind the ear. This action is caused by the latent property of the cable material which tends to return to its initial set after the earloop portions are formed in the temples. The temples in this instance are formed in pairs, each having their cable portions wound in opposite directions and in this manner change a prior art defect into a decided advantage, this advantage being the tendency of both temples to exert a slight pressure toward the head during the use of the mounting and thereby maintain a snug and comfortable fit.

In Figure V there is shown a slight modification of the invention wherein the relatively rigid side portion of the temple extends rearwardly to a bend 7 forming the upper portion of the ear engaging loop and thence terminates with a flexible cable portion 8 which forms the remainder of the ear engaging loop. The object of forming the temple with a relatively rigid ear engaging portion 7 is to provide means wherein the temple may be definitely adjusted for length and which through the rigidity of the material will maintain this adjustment. The flexible cable portion 8 is adapted to comfortably grip the ear to hold the mounting on the face of the wearer and is wound in a similar manner to the temple previously described, that is, in pairs having their cable portions wound in opposite directions. The rigid ear engaging portion 7 is also adjusted to exert a slight pressure on the side of the head in a manner similar to the commonly known Skull Grip temples. This provides additional means for supporting the mounting on the face of the wearer. The earloop portion which in this instance comprises the relatively rigid portion 7 and the flexible cable portion 8, is shaped to the contour of the ear and provides a snug and comfortable fit throughout.

In Figure VI there is shown a further modification of the invention in which the side portion of the temple extends rearwardly to a bend at 9 for the purpose of definitely fixing the length of the temple and providing a permanent fit with the ear of the wearer and thence extends downwardly to an outward bend 10 to which a flexible cable member 11 is secured. The flexible cable member 11 terminates with a relatively rigid ear engaging portion 12 which is made to fit the lower portion of the ear. The cable member 11 in this instance is adapted to be held clear of the ear and be utilized for the sole purpose of exerting a pressure through its resilient nature on the bearing member 12. This temple is similar in its functions to the temple shown in Fig. V, but has only two bearing surfaces or engaging points with the ear of the wearer, that is, along the contacting surface of the bent portion 9 and the bearing member 12. The bent portion 9 is adapted to exert a pressure on the side of the head in a similar manner as the prior art Skull Grip temple and forms a rigid and comfortable support for holding the mounting in place on the face of the wearer. These temples are also made in pairs having oppositely wound cable portions.

From the foregoing description it will be seen that I have provided simple, efficient and economical means of carrying out all the objects of the invention and an improved process of making same.

Having described my invention I claim:

1. A temple for an ophthalmic mounting comprising a relatively rigid member having attaching means adjacent one end and a curved rigid portion adjacent its opposite end shaped to the top of the ear and to hook over the same when on the face, said curved rigid portion having its extreme end bent away from the ear, a flexible cable member attached to the bent end, and a relatively rigid tip portion secured to the other end of the cable member, and having a portion bent away from the ear and attached to the cable portion to cooperate with the first bent portion to support the said cable out of direct engagement with the ear, the said cable portion being adapted to cause the tip portion to resiliently grip the lower rear portion of the ear.

2. A temple for an ophthalmic mounting comprising a relatively straight side portion and an ear engaging portion, said ear engaging portion comprising a relatively straight or flat portion adjacent its connection to the side portion and lying at an angle to said side portion and being shaped to fit the upper contour of the rear of the hollow or shell-like portion of the ear at its point of attachment to the head and a relatively curved portion adjacent its lower end shaped to fit the lower contour of the rear of the hollow or shell-like portion of the ear, said flat and curved portions being blended into each other but disposed at an angle to each other and said flat portion being shaped to increase the length of the ear engaging bearing upon the back of the ear to prevent the said ear engaging portion from bearing only at points adjacent the top and bottom thereof on the back of the ear to decrease the pain to the wearer engendered by said point contact.

3. A temple for an ophthalmic mounting comprising a side portion which when on the face lies along the temporal side of the head substantially in a horizontal plane and when viewed from the side is substantially straight up to a point adjacent the ear wherein it has a curved portion which fits over the upper joining portion of the helix of the ear to the head and extends downwardly and rearwardly behind the ear with a relatively straight portion which lies at an angle to the side portion and is shaped to fit the contour of the upper rear joining portion of the concha or hollow shell-like portion of the ear to the head and continuing with a forwardly curved portion which lies at an angle to the relatively straight downwardly and rearwardly extending portion and is shaped to fit the contour of the lower rear joining portion of the concha or hollow shell-like portion of the ear to the head, said forwardly curved portion having a terminal portion shaped to fit the antitragus or that portion of the ear lying behind the ear passage or behind the lobule of the ear to lessen the tendency of the ear engaging portions of said temple to cut into the flesh and hurt.

4. A temple for an ophthalmic mounting comprising a side portion formed with a relatively rigid portion having attaching means adjacent one end thereof and a flexible portion adjacent its other end blended therewith and forming a continuation of said side portion which when on the face lies along the temporal side of the head substantially in a horizontal plane and when viewed from the side is substantially straight up to a point adjacent the ear wherein the flexible portion is curved to fit over the upper joining portion of the helix of the ear to the head and extends rearwardly and downwardly behind the ear with a relatively straight portion which lies at an angle to the side portion and is shaped to fit the contour of the upper rear joining portion of the concha or hollow shell-like portion of the ear to the head and continuing with a forwardly curved portion which lies at an angle to the relatively straight rearwardly and downwardly extending portion and is shaped to fit the contour of the lower rear joining portion of the concha or hollow shell-like portion of the ear to the head, said forwardly curved portion having a terminal portion shaped to fit the antitragus or that portion of the ear lying behind the ear passage or behind the lobule of the ear and to lessen the tendency of the ear engaging portions of said temple to cut into the flesh and hurt.

EDWARD M. SPLAINE.